United States Patent [19]

Halpern

[11] 4,361,664

[45] Nov. 30, 1982

[54] FLAME-RETARDANT POLYMER COMPOSITIONS

[75] Inventor: Yuval Halpern, Skokie, Ill.

[73] Assignee: Borg-Warner Chemicals, Inc., Parkersburg, W. Va.

[21] Appl. No.: 279,659

[22] Filed: Jul. 2, 1981

[51] Int. Cl.³ .............................................. C08K 5/52

[52] U.S. Cl. .................................................. 524/118

[58] Field of Search .................... 260/45.8 R, 927 R; 8/584, 116 P, 129; 524/118

[56] References Cited

U.S. PATENT DOCUMENTS

| | | | |
|---|---|---|---|
| 2,661,365 | 12/1953 | Gamrath et al. ................. 260/461 |
| 2,773,046 | 12/1956 | Dunn et al. .................... 260/30.6 R |
| 2,883,411 | 4/1959 | Lanham ......................... 260/30.6 R |
| 4,035,448 | 7/1977 | Mayerhoefer et al. ........ 260/45.8 R |
| 4,143,101 | 3/1979 | Mayerhoefer et al. ......... 260/927 R |

OTHER PUBLICATIONS

A. M. Meston "Simple Syntheses of Cyclic Phosphate Esters", J. Chem. Soc. 1963 (Dec.), 6059.
R. S. Edmundson "Cyclic Organophosphorus Compounds-III", Tetrahedron 21 (9) 2379–2387 (1965).
Ency. of Poly. Sci. and Tech. (1964), p. 436.

*Primary Examiner*—Veronica P. Hoke
*Attorney, Agent, or Firm*—Joseph Shekleton

[57] ABSTRACT

Polymer compositions containing minor proportions of a 5,5-bis-(halomethyl)-2-hydroxy-2-oxo-1,3,2-dioxaphosphorinane. The halo atom may be either chlorine or bromine.

11 Claims, No Drawings

FLAME-RETARDANT POLYMER COMPOSITIONS

This invention relates as indicated to flame-retardant polymer compositions and, more particularly, to polymer compositions which have been rendered relatively flame-retardant by the presence of small proportions of a phosphorus- and halogen-containing acid. Still more particularly, in some instances, it relates to the combined use of such phosphorus- and halogen-containing compounds and antimony trioxide to impart flame-retardancy to polymer compositions.

BACKGROUND OF THE INVENTION

Polymers vary widely in their resistance to burning. Some, such as the polyolefins, polystyrene, polyalkyl acrylates and methacrylates, polyvinyl acetate and the like, burn readily. Polytetrafluoroethylene, polyvinylidene chloride and polyvinyl chloride, on the other hand, have a rather high resistance to burning. In any event, it obviously is highly desirable that, for certain applications, a polymer should have a high degree of flame-retardance so that it will meet safety standards imposed by government regulation on the manufacture of toys, carpeting, drapery materials, automotive parts, etc.

The treatment of the more flammable polymers to increase their resistance to burning is well known; such treatment generally has involved the incorporation in the polymer composition of substantial proportions of antimony oxide, halogenated hydrocarbons and low molecular weight phosphate esters. Ordinarily, though, the effective use of these and other additives has required their presence in such high concentrations as to adversely affect the desirable properties of the polymer. Thus, such desirable properties as hardness, clarity, strength, elasticity, etc., are diminished significantly by the presence of large amounts of a flame-retardant chemical.

The formulator's goal, in preparing a flame-retardant polymer composition, is to add just enough of the flame-retardant compound so as to provide the desired degree of flame-retardance, but no more than this minimum amount, so as to preserve as much as possible the advantageous properties of the polymer. Frequently, it is not possible to select a flame-retardant which will meet these requirements satisfactorily.

As noted earlier herein, the flame-retardant properties of the polymer compositions are provided by certain phosphorus- and halogen-containing acids.

The preparation of 2,2-di(chloromethyl)trimethylene hydrogen phosphate by reaction of 2,2-di(chloromethyl)trimethylene glycol with polyphosphoric acid at 100° C. is shown in "Simple Syntheses of Cyclic Phosphate Esters" by A. M. Meston, J. Chem. Soc., 1963 (Dec.), 6059. The reaction required 16 hours.

U.S. Pat. No. 2,661,365 (Gamrath et al.) shows in very general terms the hydrolysis (with water) of alkanediol phosphoryl monochlorides to yield the corresponding alkanediol phosphoric acids. The alkanediol nucleus is a substituted trimethylene glycol residue wherein the substituents are alkyl groups.

The hydrolysis of 2-chloro-5,5-dimethyl-2-oxo-1,3,2-dioxaphosphorinane with aqueous acetone is shown in "Cyclic Organophosphorus Compounds-III" by R. S. Edmundson, Tetrahedron, 21 (9), 2379–87 (1965), at page 2384. The hydrolysis mixture is heated over steam for 1.5 hours and the product is the corresponding phosphoric acid.

SUMMARY OF THE INVENTION

The invention of the present application is a composition comprising a normally flammable polymer and a minor proportion sufficient to impart flame-retardant properties to said composition of a 5,5-bis(halomethyl)-2-hydroxy-2-oxo-1,3,2-dioxaphosphorinane where the halo groups are either bromo or chloro.

DETAILED DESCRIPTION OF THE INVENTION

The above phosphorus- and halogen-containing compound is itself effective to render normally flammable polymer compositions relatively flame-retardant. That is, it is quite effective in the absence of known synergists. At the same time, its effectiveness is in many instances considerably enhanced by the presence of a small proportion of antimony trioxide.

The term "normally flammable polymer" includes a wide variety of polymers including olefin polymers such as polyethylene, polypropylene, polybutadiene, polyisobutylene, ethylene-propylene copolymers, EPDM copolymers and polypentenes; styrene polymers such as polystyrene, high impact polystyrene (polystyrene grafted onto a rubbery substrate such as polybutadiene or a styrene-butadiene copolymer), ABS resins, MBS resins and styrene-acrylonitrile copolymers; polyvinyl acetate; polyvinyl ethers; polyvinyl alcohol; polyphenylene oxide; and polycarbonates. Polypropylene and styrene polymers are preferred.

Those phosphorus- and halogen-containing compounds are preferred where the halogen atoms are bromine. Whereas the chlorine-containing compounds are somewhat effective to raise the oxygen index of high impact polystyrene, the corresponding bromine-containing compound is effective to raise this same oxygen index to a much greater extent, and also, to cause the polymer composition to score V-O in the Underwriters Laboratory Test UL-94.

The amount of phosphorus- and halogen-containing additive to be used should be within the range of from about 18 pph (parts per hundred parts of resin) to about 35 pph. In many cases, no synergist is required to provide a satisfactory level of flame-retardance, but when one is necessary, a concentration of from about 1 pph to about 10 pph is preferred.

The phosphorus- and halogen-containing additives herein may be prepared by reacting stoichiometric quantities of 5,5-bis-(halomethyl)-2-chloro-2-oxo-1,3,2-dioxaphosphorinane where the halo groups are bromine or chlorine, and water. The process is carried out at a temperature within the range of from about 20° C. to about 100° C. The following example is illustrative.

EXAMPLE 1

A 100-ml., round-bottom, 3-necked flask fitted with a condenser, magnet bar stirrer and nitrogen inlet and outlet is charged with 6.85 g. (0.02 mol) of 6,5-bis(-bromomethyl)-2-chloro-2-oxo-1,3,2-dioxaphosphorinane and 55 ml. of acetonitrile and the resulting solution is stirred and heated to reflux temperature under a slow stream of dry nitrogen. Water (0.36 ml . . . 0.02 mol) is injected into the refluxing solution and the evolved hydrogen chloride is monitored by trapping it in aqueous sodium hydroxide. One half the theoretical amount of hydrogen chloride is trapped within three hours. The reaction mixture is heated with continued stirring for an additional 48 hours, then cooled and filtered and the solid washed with 25 ml. of acetonitrile, then dried in vacuo at 50° C. (Yield: 2.48 g.). The filtrate is evaporated under reduced pressure to a white residue weighing 3.76 g. These solids are combined and crystallized from hot toluene to yield a product melting at 165°–170° C. It is identified as 5,5-bis(bromomethyl)-2-hydroxy-2-oxo-1,3,2-dioxaphosphorinane by means of $^{13}$C nmr, elemental and mass spectrographic analyses. Elemental analyses: C, 18.41% (18.52%); H, 2.78% (2.78%); Br, 49.05% (49.38%); P, 10.01% (9.53%).

Preparation of the flame-retardant compositions of this invention (for test purposes) may be accomplished by mixing the ingredients in an electrically heated Brabender head for about 10 minutes at 200° C. and 60 rpm. The test specimens for which data is shown in the Table are prepared from compression molded slabs.

The ABS compositions for which data is set out in the Table each contain, in addition to the ABS and phosphorus- and halogen-containing additive, 0.25 pph of ethylene-bis-stearamide. The other polymer compositions shown contain only the indicated polymer and flame-retardant additive.

The flame retardance of a plastic material can be determined by means of Underwriters Laboratories Test UL-94. The test specimen measures 5"×0.5"×0.125"; it is suspended vertically at a measured height above the flame (as specified in the above test) from a Bunsen burner. After 10 seconds the flame is removed and the duration of the flaming of the test specimen is noted. Immediately, the flame is placed again under the specimen and after 10 seconds the flame again is withdrawn and the duration of flaming and glowing is noted. Five test specimens are thus tested and the results of all five tests are considered in the determination of a rating for the plastic material.

The following are noted: (1) duration of flaming after first flame application; (2) duration of flaming after second flame application; (3) duration of flaming plus glowing after second flame application; (4) whether or not specimens burn up to their point of suspension; and (5) whether or not specimens drip flaming particles which ignite a cotton swatch placed 12 inches beneath the test specimen. The highest rating given to a material is "V-0". It indicates that (1) no specimen burns with flaming combustion for more than 10 seconds after each application of the test flame; (2) the material does not have a flaming combustion time exceeding 50 seconds for the 10 flame applications for each set of 5 specimens; (3) no specimen burns with flaming or glowing combustion up to the holding clamp; (4) no specimen drips flaming particles that ignite the dry cotton beneath the specimen; and (5) no specimen glows for more than 30 seconds after the second removal of the flame.

The next highest rating is "V-1". It indicates that (1) no specimen burns with flaming combustion for more than 30 seconds after each application of the test flame; (2) the material does not have a flaming combustion time exceeding 250 seconds for the 10 flame applications for each set of 5 specimens; (3) no specimen burns with flaming or glowing combustion up to the holding clamp; (4) no specimen drips flaming particles that ignite the dry surgical cotton beneath the specimen; and (5) no specimen glows for more than 60 seconds after the second removal of the flame.

A "V-2" rating is given to a composition (1) when no specimen burns with flaming combustion for more than 30 seconds after each application of the test flame; (2) it does not have a total flaming combustion time exceeding 250 seconds for the 10 flame applications for each set of 5 specimens; (3) no specimen burns with flaming or glowing combustion up to the holding clamp; (4) some specimens drip flaming particles which burn only briefly, some of which ignite the dry cotton beneath the specimen, and (5) no specimen glows for more than 60 seconds after the second removal of the flame.

The lowest rating given to a material in this test is "NSE" ("non-self-extinguishing"). It indicates that the material has failed to meet one or more of the criteria for the UL-94 vertical test.

Another test for the flammability of a plastic material measures the minimum concentration of oxygen that will just support combustion. The test is an ASTM test, D 2863-70. It is carried out in a glass column wherein the concentration of oxygen is varied until that concentration is found which will just support the burning of a test specimen, for 3 minutes or until 50 mm of the specimen has burned. The test specimen is 70–150 mm long by 6.5 mm wide by 3.0 mm thick. This concentration of oxygen is called the oxygen index. A high oxygen index indicates a highly flame-retardant specimen.

The effectiveness of the polymer compositions herein in resisting flaming is shown in the Table below. The indicated amounts are pph.

TABLE I

| Additive | PP[1] | HIPS[2] | | PS[3] | | ABS[4] | |
|---|---|---|---|---|---|---|---|
| 5,5-bis-(bromomethyl)-2-hydroxy-2-oxo-1,3,2-dioxaphosphorinane | 20 | 24 | | 24 | 20 | 24 | 25 |
| 5,5-bis-(chloromethyl)-2-hydroxy-2-oxo-1,3,2-dioxaphosphorinane | | | 24 | | | | |
| $Sb_2O_3$ | 9 | | | | 4 | 9 | 4 |
| UL-94 Rating | V-2 | V-0 | NSE | V-2 | V-2 | V-0 | V-2 |
| Oxygen Index | 29.0 | 25.6 | 22.2 | 25.6 | 29.0 | 27.2 | 23.3 |

[1] polypropylene
[2] high impact polystyrene (polystyrene grafted onto polybutadiene)
[3] polystyrene
[4] a copolymer of styrene and acrylonitrile grafted onto polybutadiene A consideration of the data in the above Table shows the effectiveness of the flame-retardant additives of the present invention, especially the 5,5-bis-(bromomethyl)-2-hydroxy-2-oxo-1,3,2-dioxaphosphorinane.

All parts herein, unless otherwise expressly stated, are by weight.

I claim:

1. A composition comprising a normally flammable polymer selected from the class consisting of olefin polymers and styrenic polymers and a minor proportion, sufficient to impart flame-retardant properties to said composition, of 5,5-bis(bromomethyl)-2-hydroxy-2-oxo-1,3,2-dioxaphosphorinane.

2. The composition of claim 1 wherein the normally flammable polymer is a styrenic polymer.

3. The composition of claim 1 wherein the normally flammable polymer is polypropylene.

4. The composition of claim 2 wherein the styrenic polymer is an acrylonitrile-butadiene-styrene resin.

5. The composition of claim 2 wherein the styrenic resin is methyl methacrylate-butadiene-styrene resin.

6. The composition of claim 1 wherein it additionally contains antimony trioxide.

7. The composition of claim 6 wherein the normally flammable polymer is a styrenic polymer.

8. The composition of claim 7 wherein the normally flammable polymer is polystyrene.

9. The composition of claim 7 wherein the normally flammable polymer is an acrylonitrile-butadiene-styrene resin.

10. The composition of claim 7 wherein the normally flammable polymer is a high impact polystyrene.

11. The composition of claim 7 wherein the normally flammable polymer is polypropylene.

* * * * *